United States Patent [19]

Forgac et al.

[11] Patent Number: 5,262,046
[45] Date of Patent: Nov. 16, 1993

[54] IN-LINE CYCLONE SEPARATOR AND METHOD OF SOLID/GAS SEPARATION

[75] Inventors: John M. Forgac, Elmhurst; Mark S. Camp, LaGrange Park, both of Ill.

[73] Assignee: Amoco Corporation, Chicago, Ill.

[21] Appl. No.: 813,997

[22] Filed: Dec. 27, 1991

[51] Int. Cl.⁵ .................. C10G 35/10; B01D 45/12
[52] U.S. Cl. .......................... 208/161; 208/153; 55/447; 55/456; 55/457; 422/147
[58] Field of Search .............. 208/153, 161, 48 Q; 422/147; 55/447, 456, 457

[56] References Cited

U.S. PATENT DOCUMENTS

| | | | |
|---|---|---|---|
| 2,687,780 | 8/1954 | Culhane | 183/22 |
| 3,358,844 | 12/1967 | Klein et al. | 55/456 |
| 3,396,511 | 8/1968 | Fracke et al. | 55/456 |
| 3,448,563 | 6/1969 | Sobeck | 55/347 |
| 3,546,854 | 12/1970 | Muller | 55/457 |
| 4,173,527 | 11/1979 | Heffley et al. | 208/153 |
| 4,350,510 | 9/1982 | Hamada et al. | 55/349 |
| 4,737,346 | 4/1988 | Haddad et al. | 422/144 |
| 4,891,129 | 1/1990 | Barnes | 208/153 |
| 4,904,281 | 2/1990 | Raterman | 55/1 |
| 5,043,058 | 8/1991 | Forgac et al. | 208/48 Q |

Primary Examiner—Theodore Morris
Assistant Examiner—Walter D. Griffin
Attorney, Agent, or Firm—Scott P. McDonald; Richard A. Kretchmer; Frank J. Sroka

[57] ABSTRACT

Methods and apparatus are disclosed for separating solids from a mixture of solids and gases. An in-line cyclone separator cyclonically swirls the mixture as it exits a conduit concentrically located within a radially symmetric separation chamber. In some embodiments, stripping gas apertures direct stripping gas into the chamber to help maintain the angular momentum of the solids cyclonically swirling within the chamber.

46 Claims, 3 Drawing Sheets

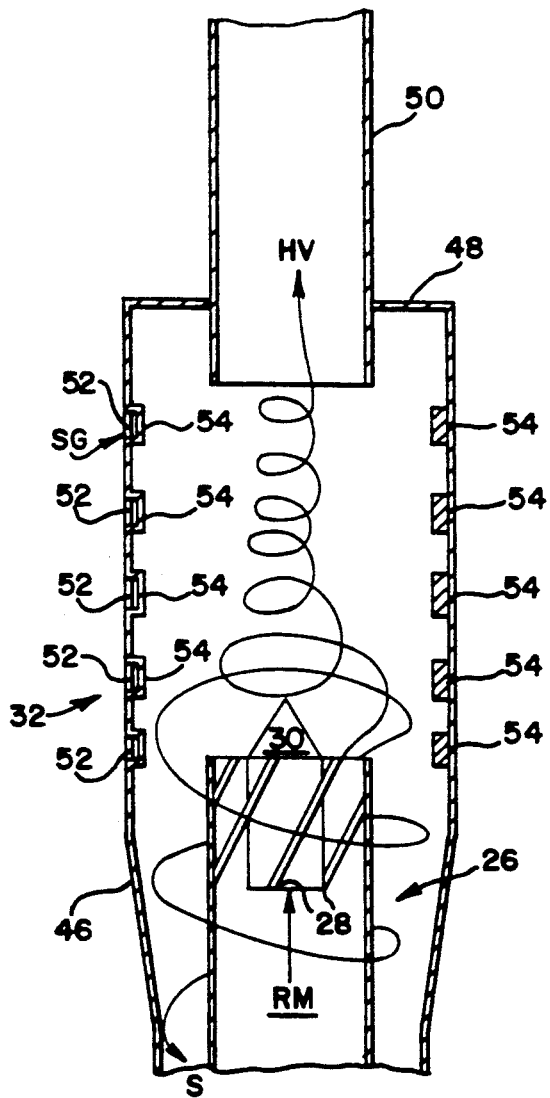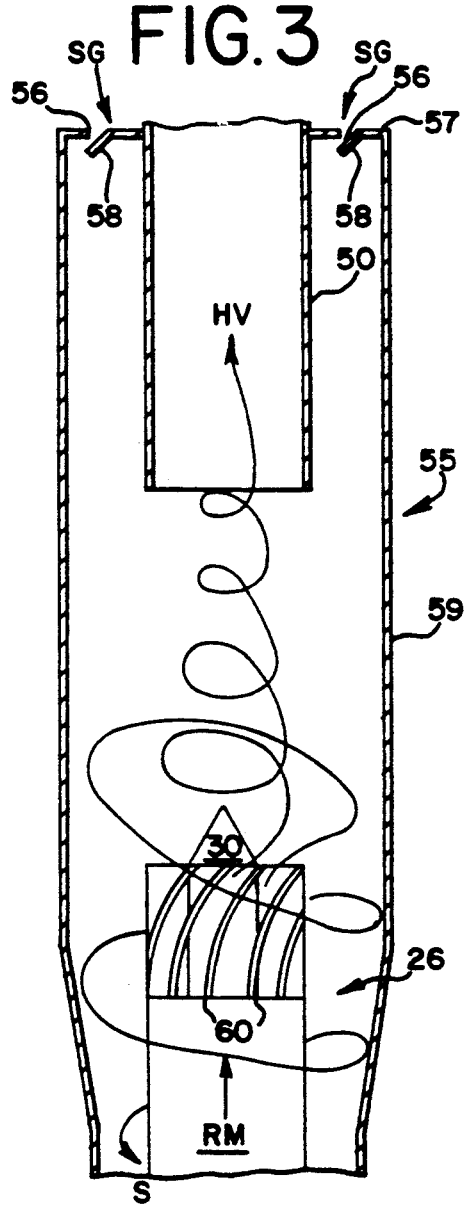

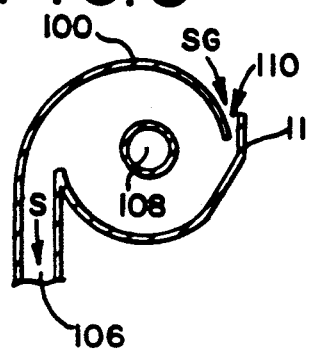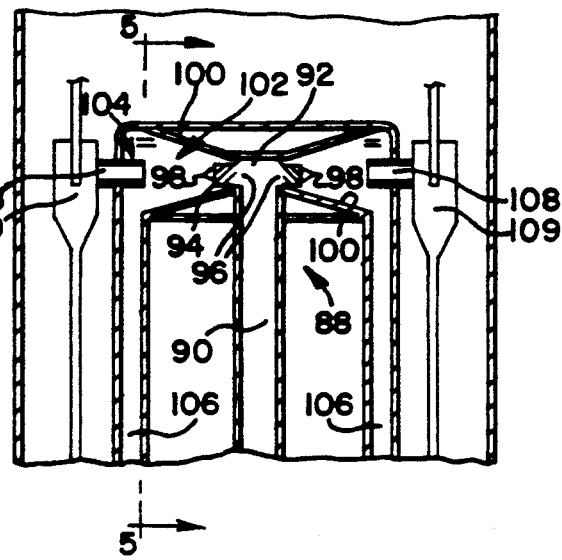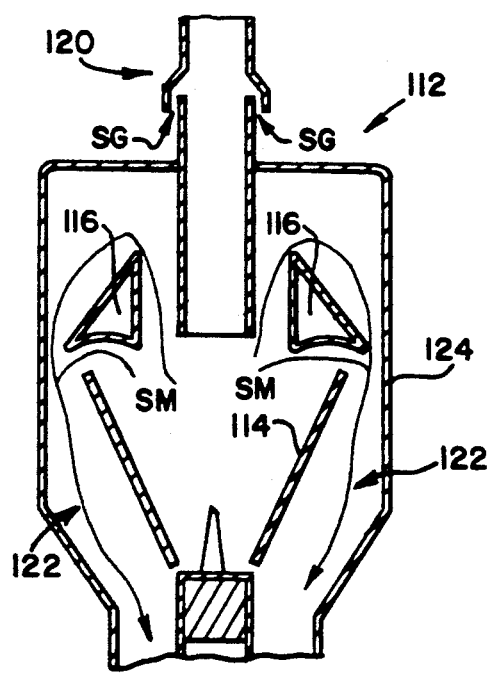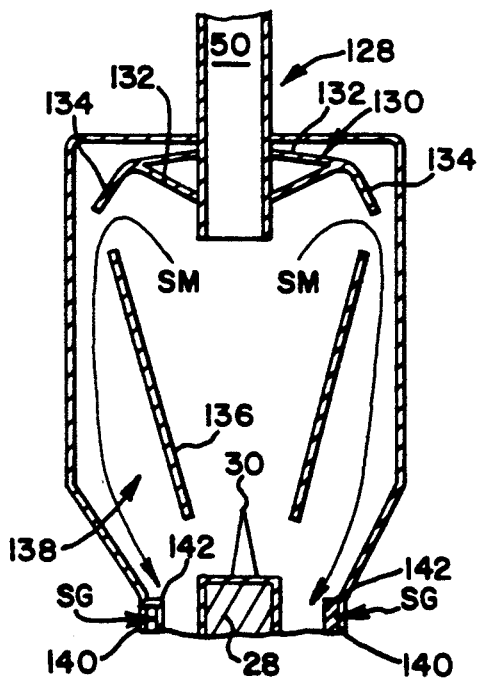

IN-LINE CYCLONE SEPARATOR AND METHOD OF SOLID/GAS SEPARATION

FIELD OF THE INVENTION

This invention relates to methods and apparatus for separating solids from a mixture of solids and gases. More particularly, the invention relates to methods and apparatus for separating solids from a mixture of solids and gases by cyclonically swirling the mixture as the mixture is discharged from a conduit concentrically located within a radially symmetric separation chamber.

BACKGROUND OF THE INVENTION

Many modern chemical manufacturing processes require separating solids from a mixture of solids and gases. For example, when a fluidized bed of solid catalyst and feedstock is reacted to form a reaction mixture of spent catalyst and a vapor-phase product, the catalyst typically must be separated from the mixture when the reaction is complete. A common example of such a process is the catalytic cracking of relatively high molecular weight hydrocarbon feedstock to lower molecular weight gasoline range materials.

Modern catalytic cracking operations react a mixture of hot solid catalyst with a relatively high molecular weight feedstock inside a riser reactor. In this type of operation, a fluidized bed of hot catalyst and feedstock is converted to lower molecular weight hydrocarbon vapors and spent catalyst as material moves upwardly through the reactor. The spent catalyst then must be separated from the hydrocarbon vapors so that the spent catalyst can be regenerated and reused and so that the cracked vapors can be further processed.

Because catalytic cracking and the subsequent catalyst-vapor separation typically are carried out at temperatures around 1000 degrees Fahrenheit or greater, gasoline range products produced by the catalytic cracking reaction are subject to undesired secondary thermal cracking if they are not quickly separated from spent catalyst and moved to a lower temperature environment. For example, it is believed that about ten percent of the desired gasoline range reaction products can be lost if the reaction products are maintained in an 1100 degree Fahrenheit environment for 4 to 5 seconds. Therefore, the time spent separating catalyst from gasoline range vapors can substantially impact product yields.

In some refineries, catalytic cracking and catalyst separators have been carried out in open vapor path systems having a riser reactor located within a large catalyst disengagement vessel. In this type of system, catalyst and cracked vapors exiting the riser reactor typically undergo a sudden change in direction to effect a rough separation of solids from vapors prior to the solids and vapors being discharged into the surrounding disengagement vessel volume. One or more cyclone separators located either within or just external to the disengagement vessel volume then draw solids-depleted gas from the vessel volume to separate additional solids from the solids-depleted gas. The cyclones then discharge a further solids-depleted gas for processing.

Catalyst separated in these systems usually collects in a lower region of the disengagement vessel. Stripping steam typically is passed through the collected catalyst to purge hydrocarbon vapors resident in the catalyst. The purged vapors and stripping steam, collectively known as stripping gas, mix with the solids-depleted vapors present in the disengagement vessel and also exit the vessel through the cyclone separators. Examples of an open vapor path systems such as this can be found in U.S. Pat. No. 4,500,423 to Krug, et al.

The modern trend toward more reactive catalysts and higher reaction temperatures has emphasized a major deficiency in open vapor path designs similar to those discussed above. Because the desired gasoline range products are discharged from the riser reactor into a large disengagement vessel volume and reside there until drawn into a cyclone, the desired products have a sufficiently long residence time within the vessel to cause a significant decrease in yield from secondary thermal cracking.

The recognition of undesired thermal cracking problems in open vapor path systems has led to the development of systems having substantially closed vapor paths between the riser reactor and subsequent separation equipment. By maintaining closed vapor flow paths instead of discharging cracked products into the large disengagement vessel volume, the residence time of the products at thermal cracking temperatures can be greatly decreased. Examples of such closed systems can be found in U.S. Pat. Nos. 4,623,446, 4,654,060 and 4,909,993 to Haddad, et al.

Unfortunately, closed vapor path systems generally are unable to damp pressure and catalyst surges known to occur in catalytic cracking riser reactors. These surges result from equipment malfunctions, vaporization of water present in reactor feedstock or from system pressure upsets. Because the surges are not damped into a larger disengagement vessel volume, the surges propagate through the catalyst separation equipment located downstream of the reactor. The propagated surges significantly reduce the efficiency of catalyst separation equipment such as cyclone separators and therefore cause unwanted catalyst to appear in the gasoline range product stream.

Efforts have been made to obtain the surge damping advantages of an open vapor path system while at the same time maintaining an essentially closed vapor path for cracked products. In these compromise systems, riser reactor effluent follows a closed vapor path to a cyclone separator having a bottom opening into a surrounding disengagement vessel volume. One such design can be found in U.S. Pat. No. 4,478,708 to Farnsworth. Farnsworth discloses that solids can be cyclonically separated in an open-bottomed cyclone while still providing an essentially closed path through the cyclone for gaseous reaction products. Unless a pressure surge occurs, the lower pressure downstream of the open-bottomed cyclone allows gases leaving the riser reactor to follow an essentially closed path through the cyclone to the secondary catalyst separation equipment. When a pressure surge occurs, the surge pressure overcomes the effect of the lower downstream system pressure, causing the surge to be damped into the disengagement vessel volume through the open cyclone bottom.

Although Farnsworth's system represents an improvement over the designs previously discussed, his use of open-bottomed cyclones compromises the initial separation of solids and gases. Solids separated by Farnsworth's open-bottomed cyclones collect near the bottom of the disengagement vessel and are steam stripped as in the other open vapor path systems already described. Because the relatively low pressure present in Farnsworth's open-bottomed cyclones draws in a flow of stripping gas countercurrent to the generally downward flow of separated catalyst, his design permits reentrainment of solids in the upwardly moving stripping gas, thereby degrading the separation efficiency of the open-bottomed cyclone.

The limitations of the foregoing designs suggest what is needed is a solids separation system particularly suited to catalytic cracking operations. Ideally, the system provides a short, closed vapor path out of the system for vapors exiting the riser reactor so that secondary thermal cracking can be minimized. Additionally, the system preferably provides for rapid separation of spent catalyst from the reaction mixture while minimizing reentrainment of separated catalyst in the cracked vapors. Finally, the system must accommodate pressure and catalyst surges without suffering serious degradation of separation efficiency.

Various modification of the systems already discussed have been proposed to accomplish one or more of the above objects.

U.S. Pat. No. 4,581,205 to Schatz discloses that the effects of pressure surges in a catalytic cracking solids disengagement system might be mitigated by using a passageway having one or more pressure-actuated trickle valves opening from an otherwise generally closed system. Schatz' design adds an undesired degree of mechanical complexity to the system and raises questions about the reliability of the required mechanical components under the severe catalytic cracking operating conditions.

U.S. Pat. No. 4,482,451 to Kemp discloses a design in which the catalyst-vapor mixture exiting the riser is downwardly swirled as it passes through curved discharge arms to effect an initial separation of catalyst and vapors. An optional open-bottomed cylindrical shroud having a generally closed top with a discharge port encircles the discharge arms to provide a volumetrically large but generally closed vapor path for vapors exiting the arm and passing upward through the discharge port. This design appears to suffer from the same deficiencies as open-bottomed cyclone designs generally and would seem to substantially increase vapor residence time over that of a generally closed system.

U.S. Pat. No. 4,572,780 to Owen discloses a closed vapor path design having a plurality of blades located at the upper end of a riser reactor. The blades spin the catalyst and vapor exiting the riser into a deflector located just above the reactor. The catalyst particles are downwardly deflected off the deflector to effect a rapid separation of catalyst and vapors. Vapors pass vertically upward through a riser located over the deflector and into a closed cyclone separator. While the design provides a relatively short, direct, vertical path from the riser reactor, the design appears to be subject to an inability to mitigate the pressure surge problems generally associated with closed vapor path systems.

Although each of the above designs attempts to provide an improved method for quickly separating solids from a mixture of solids and gases, none of these designs provides a mechanically simple, generally closed vapor path system which simultaneously can separate solids, damp pressure surges from the riser reactor and provide for the minimal hydrocarbon vapor residence times required to minimize undersired thermal cracking.

SUMMARY OF THE INVENTION

It is an object of the present invention to provide an improved method and apparatus for separating solids from a mixture of solids and gases.

It is another object of the invention to provide a method and apparatus for separating solids from a mixture of solids and gases that mitigates the effects of pressure transients introduced into the separation apparatus.

It is yet another object of the invention to minimize the residence time of gases in a separation device.

It is another object of the invention to provide a mechanically simple apparatus for accomplishing the above-listed objects.

The foregoing objects can be accomplished by providing an in-line cyclone separator which cyclonically swirls a mixture of solids and gases as it exits a conduit concentrically located within a radially symmetric separation zone or chamber. Centrifugal forces acting on the solids present in the mixture cause the solids to become separated and move outwardly and downwardly along the chamber walls or zone while a stream of solids-depleted gas is withdrawn from the chamber. Unlike the Owen reference, in which catalyst particles are deflected downward shortly after exiting a riser, the presence of a separation chamber located above the conduit permits the cyclonic rotation of at least some solids to be maintained within the chamber. The momentum of the spinning solids moving through the chamber damps pressure and catalyst surges introduced into the chamber, thereby minimizing the effects of those surges on process equipment located downstream of the separator. Furthermore, because surges are damped by the inventory of cyclonically moving solids within the chamber, the reaction mixture need not be discharged into a large volume to damp the surges. The in-line separator therefore provides the short gas residence time normally associated with a closed vapor system while at the same time accommodating surges of pressure and catalyst.

BRIEF DESCRIPTION OF THE DRAWINGS

FIG. 2 is an enlarged sectional view of the separator of FIG. 1.

FIG. 3 is a sectional view of another embodiment of an in-line cyclone separator.

FIG. 4 is a sectional view of a generally horizontal in-line cyclone separator.

FIG. 5 is a cross-sectional view of the separator embodiment shown in FIG. 4 taken along line 5—5 of FIG. 4.

FIGS. 6 and 7 are sectional views of other in-line cyclone separators having internal baffles for directing surging reaction mixtures.

DETAILED DESCRIPTION OF THE INVENTION

Figure 1:
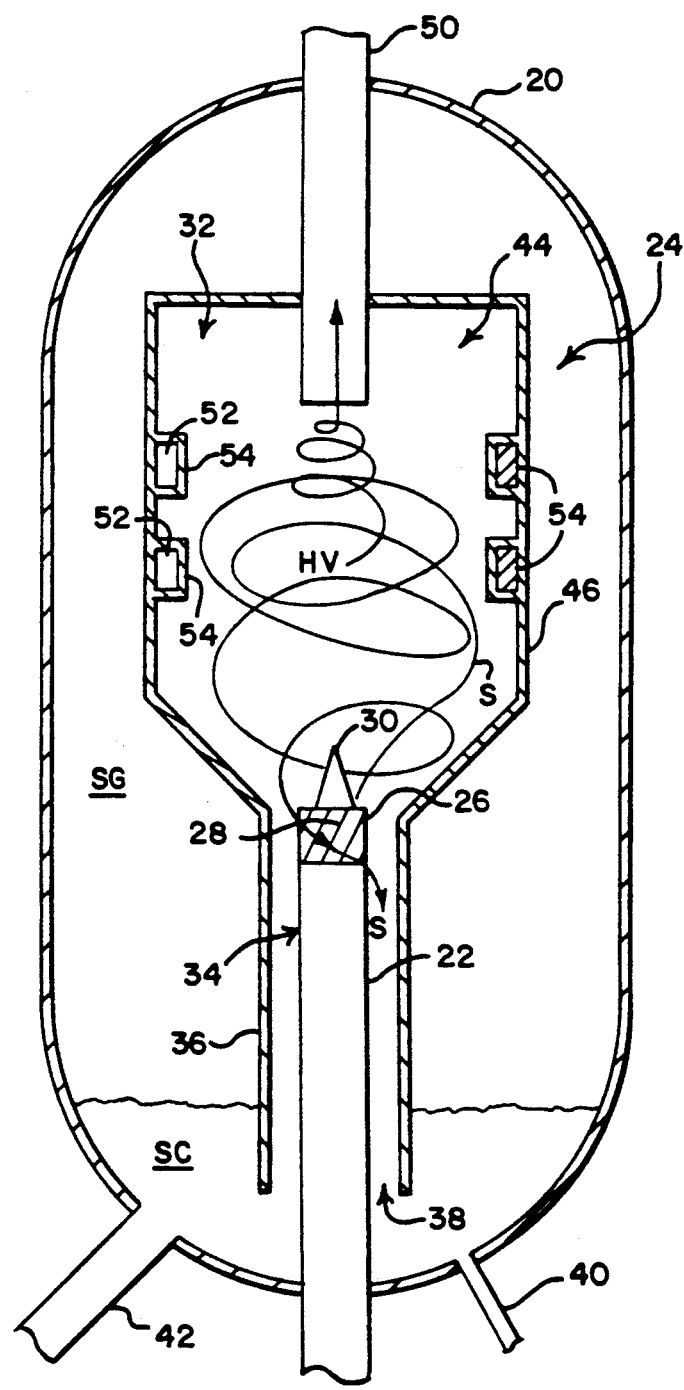
FIG. 1 is a sectional view of a catalytic cracking reactor and associated in-line cyclone separation equipment in accordance with the present invention.

Each of the in-line cyclone separators described in conjunction with FIGS. 1-7 utilizes the properties of a cyclonically spinning mixture of solids and gases to quickly separate solids from the mixture while at the same time providing the ability to damp pressure and catalyst transients. While these embodiments are particularly useful for separating spent catalyst from a spent catalyst and hydrocarbon vapor reaction mixture discharged from a catalytic cracking riser reactor, the invention is useful in any application requiring a quick separation of solids from a mixture of solids and gases. It should also be noted that while the described embodiments of the invention are separators located within a larger disengagement vessel which can draw a stripping gas from the vessel into the separator, the separators can also form a part of closed vapor path systems not contained within a larger disengagement vessel. In this case, a different process gas such as a quenching gas used to cool the cracked hydrocarbon vapors can comprise the process gas entering the separator through the gas inlet apertures described below FIG. 1 illustrates one embodiment of the invention which is useful for separating spent catalyst from cracked hydrocarbons. In this embodiment, a disengagement vessel 20 encloses a riser reactor 22 and an in-line cyclone separator 24 in accordance with the present invention.

Riser reactor 22 includes an upper end 26 located within separator 24. Reactor upper end 26 includes a plurality of swirl vanes 28 located within upper end 26 and a vortex stabilizer 30 concentrically protruding from upper end 26. Swirl vanes 28 impart cyclonic motion to spent catalyst S and hydrocarbon vapors HV exiting reactor upper end 26, and vortex stabilizer 30 provides a surface upon which the vortex of the cyclonically flowing material can attach itself. The use of vortex stabilizer 30 is preferred but not essential.

A generally cylindrical separation chamber 32 surrounds riser reactor upper end 26. Chamber 32 contains the cyclonically moving reaction mixture of spent catalyst and hydrocarbon vapors exiting reactor 22. Chamber 32 includes a chamber lower portion 34 located below reactor upper end 26 and surrounded by a lower cylindrical wall member 36. Catalyst separated by separator 24 falls downwardly through lower chamber portion 34 into a spent catalyst bed SC. It should be understood that lower chamber portion 34 need not be submerged in bed SC as catalyst can simply fall through an open lower wall member bottom onto bed SC (not shown) without affecting operation of the invention. Catalyst in bed SC eventually passes downward through an open bottom 38 of lower wall member 36 as the level of catalyst within chamber 32 equilibrates with the portion of bed SC external to chamber 32. Chamber 32 can be of any radially symmetric shape capable of sustaining the cyclonic motion of the materials swirling within the chamber, although the conical separation zones of FIGS. 4-7 are preferred as is discussed in conjunction with those Figures. While chamber dimensions are non-critical, it is preferred that the chamber diameter at the discharge end of conduit 26 be about three conduit diameters or less as greater chamber diameters make it more difficult to establish and maintain cyclonic flow within separator 24.

Spent catalyst collecting in bed SC is purged of entrained hydrocarbon vapors by injecting stripping steam into bed SC through a stripping steam inlet line 40. The combined steam and hydrocarbon vapors comprise a stripping gas SG that rises through bed SC into the upper portion of vessel 20. Stripped catalyst can be withdrawn from vessel 20 through spent catalyst discharge line 42.

Chamber 32 also includes a chamber upper portion 44 located above upper reactor end 26 which is surrounded by upper cylindrical wall member 46. A chamber top 48 is fastened around the upper periphery of upper wall member 44 to close the upper end of chamber 32.

A finder tube 50 is concentrically located within top 48. Tube 50 centers the upper end of the vortex of cyclonically swirling mixture within chamber 32 and is used to withdraw catalyst-depleted vapors from chamber 32. While tube 50 preferably is concentrically located within chamber 32 to operate as a vortex finder, a solids-depleted gas outlet tube may be otherwise located near the top of chamber 32. In this case, the gas outlet tube should be located sufficiently above upper end 26 so as not to disturb the cyclonic flow of solids within chamber 32.

Separation chamber 32 additionally includes a plurality of stripping gas inlet apertures 52 located in upper cylindrical wall member 46. Apertures 52 permit stripping gas SG to enter chamber 32 so that gas SG can be withdrawn through finder tube 50 along with the catalyst-depleted gas. As will be discussed in detail in conjunction with FIG. 2, it is preferred that stripping gas inlet baffles or ducts 54 be included to direct the flow of stripping gas entering chamber 32. While a plurality of apertures 52 and ducts 54 are shown in the Figures, other stripping gas inlet configurations such as a single elongate aperture with or without a duct may also be used in the separator. Although the actual aperture and duct location is noncritical, it is preferred that the chosen configuration provide for a stripping gas inlet velocity of between 30 and 100 feet per second.

The flow of materials through the system shown in FIG. 1 is as follows. A mixture of hot, fresh catalyst and hydrocarbon feedstock is continuously introduced into the bottom of riser reactor 22. The hot catalyst vaporizes the feedstock and the mixture reacts as it rises through reactor 22, forming a reaction mixture of predominantly spent catalyst and cracked hydrocarbon vapors by the time the materials reach the top of reactor 22.

As the reaction mixture exits reactor 24, it passes over swirl vanes 28. Vanes 28 impart a cyclonic motion to the exiting reaction mixture, thereby creating an inventory of cyclonically swirling solids and gases within chamber 32. The centrifugal forces acting on the solids cyclonically moving within chamber 32 causes solids S to spin upwardly and outwardly toward cylindrical wall members 36 and 46. At least some solid particles S spin cyclonically upwardly at first and then slow and begin to spiral downwardly, eventually falling into bed SC. The solids are then stripped with steam and removed for regeneration as already discussed. It is preferred that the height of separation chamber 32 be sufficient to allow cyclonically moving solids to spiral upwardly without impinging on the chamber top as this will allow the particles to continue to move cyclonically as they slow and begin to move downwardly.

While the cyclonically spinning solids in chamber 32 are spiraling outwardly and downwardly, cyclonically swirling vapors HC are drawn upwardly and inwardly toward finder tube 50 because of a pressure gradient across tube 50. Finder tube 50 is at a lower pressure than chamber 32 due primarily to the condensation of gases downstream of separator 24. The gases withdrawn through tube 50 preferably are passed through additional stages of cyclonic separation located either within or external to vessel 22 (not shown) to remove catalyst particles remaining in the solids-depleted gas. The relatively short closed vapor path from riser reactor upper end 26 to finder tube 50 minimizes the residence time of hydrocarbon vapors within separator 24 and vessel 20, thereby minimizing undesired secondary thermal cracking of catalytically cracked hydrocarbon vapors.

The design illustrated in FIG. 1 provides a significant advantage over other types of separators because it mitigates the effects of pressure or catalyst transients known to upset the performance of other separators. First, the angular momentum of the inventory of spinning solids present within chamber 24 sustains a cyclonic flow whose momentum dominates the destabilizing effects of surging catalyst introduced into the chamber. Additionally, the relationship between cyclonic velocity and separator pressure drop is such that pressure drop increases as riser discharge velocity increases. Thus, when a pressure surge causes riser exit velocity to increase, separator pressure drop increases, which in turn limits the increase in separator exit velocity. Reducing the separator exit velocity in this manner attenuates the pressure surge, thereby mitigating the effects of the surge on downstream process equipment such as secondary cyclones.

The entry of stripping gas SG into chamber 24 is best discussed in conjunction with FIG. 2. A plurality of stripping gas inlet apertures 52 allow stripping gas to enter chamber 24 from vessel 20. Apertures 52 are shown in vertical alignment on opposite sides of upper cylindrical wall member 46, although the location of apertures 52 is not critical. Stripping gas inlet baffles 54 are attached to wall member 46 near each aperture 52. Baffles 54 direct stripping gas entering apertures 52 tangentially to wall member 46, thereby causing the entering stripping gas to swirl cyclonically in the same direction as the reaction mixture rotating in the chamber. By causing the entering gas to swirl in the same direction as the catalyst and hydrocarbon vapors swirling in chamber 24, the stripping gas increases the momentum of the cyclonically swirling solids near the wall, thereby further enhancing separation of solids within the chamber. At the same time, the entering stripping gas flows over the inner surface of wall member 46, thereby protecting wall member 46 from erosion caused by the impact of catalyst particles on wall member 46. The use of baffles 54 to cyclonically swirl the entering stripping gas SG in this manner is preferred. This design provides the further advantage of allowing the entering stripping gas to contact spent catalyst immediately after the spent catalyst is discharged from reactor 22.

FIG. 3 illustrates another embodiment of an in-line cyclone separator 55 useful in the system shown in FIG. 1. Separator 55 includes a plurality of stripping gas inlet apertures 56 located in a chamber top 57. Stripping gas inlet baffles or ducts 58 direct the flow of stripping gas into chamber 32, eliminating the need for stripping gas apertures in wall 59. As in FIG. 2, it is preferred that ducts 58 direct the gas in such a way as to complement the cyclonic flow of catalyst and hydrocarbon vapors in chamber 32. Alternatively, finder tube 50 can extend into an open chamber top (not illustrated), thereby allowing stripping gas SG to flow into the open top around tube 50. By allowing the relatively solids-free stripping gas to enter the top of the separator, this open-topped embodiment causes the entering stripping gas to flow downwardly toward the cyclonically rotating solids, thereby pushing the rotating solids away from the inlet end of finder tube 50.

FIG. 3 also illustrates a preferred embodiment of curved swirl vanes 60. A useful embodiment of swirl vane 60 is a spirally arcing vane which arcs approximately 65 degrees toward horizontal over the length of the vane. Other preferred vane structures may exhibit as little as 25 degrees of arc. Other shapes of swirl vane or impeller-type structures may be used in the invention as long as they are capable of inducing cyclonic mixture flow within separation chamber. It is preferred that curved vanes 60 and vortex stabilizer 30 be cast as a single unit and hardened to minimize erosion from catalyst particles impacting thereon. It should be understood that vanes 28 and 60 need not be positioned completely within riser reactor upper end 26 as shown, but can be attached to reactor upper end 26 or located sufficiently in proximity to end 26 so as to cyclonically swirl the exitting reaction mixture.

A substantially horizontal embodiment of a dual in-line cyclone separator is illustrated in FIGS. 4 and 5. In this embodiment, dual in-line cyclone separator 84 includes a pair of radially symmetric separation chambers 86 located within a generally cylindrical housing 88 having a substantially horizontal axis. A riser reactor 90 terminates in a T-shaped header 92 which includes mixture discharge ends 94 for introducing reaction mixture into chambers 86. Ends 94 include swirl vanes 96 and vortex stabilizers 98 similar to those discussed in conjunction with FIG. 3 for imparting a swirling motion to reaction mixture as it exits reactor discharge ends 94.

Radially symmetric wall members 100 taper from relatively small radius inlet ends 102 to relatively greater radius outlet ends 104. The radial symmetry of wall members 100 allows catalyst particles to cyclonically spin within chambers 86. The increasing radius of wall members 100 is preferred in this and in the vertical embodiments of the invention as explained below because the increasing chamber radius generally encourages the cyclonic motion of outwardly moving particles. In the horizontal embodiment of FIGS. 4 and 5, the increasing radius of chamber wall member 100 may also be preferred because the downwardly sloping wall portions can help direct separated solids toward solids removal lines 106 located on the lower side of chambers 100 near outlet ends 104. Lines 106 are preferred to be tangentially oriented with respect to wall members 100 as shown so that the centrifugal force of the rotating solids S forces the solids down into lines 106. A solids-depleted gas consisting of catalyst fines and hydrocarbon vapors is withdrawn from near the outlet ends of chambers 86 through cyclone inlet finder tubes 108 of cyclones 109 so that additional solids can be removed from the solids-depleted gas. Stripping gas inlet apertures 110 and duct 111 allow stripping gas SG to be tangentially admitted to chambers 86 as in the embodiments already discussed.

A single or dual horizontal in-line cyclone embodiment such as the one shown in FIGS. 4 and 5 may be preferred in certain installations where a horizontally oriented in-line cyclone is more easily adapted to existing structures. The horizontal orientation of the cyclone does not affect performance as the centrifugal forces exerted on cyclonically swirling solids in the separator are typically 3 orders of magnitude or so greater than competing gravitational effects. It should be understood, therefore, that the in-line cyclone invention can be operated along an inclined axis as well as along the vertical and horizontal axes shown in the Figures.

Certain performance advantages may be obtained in separators of the type shown in FIGS. 4 and 5 by extending vortex stabilizer 98 outwardly to the inlet end of finder tube 108, especially under conditions of low solids loading. Approximate relative dimensions useful under these conditions include a separation chamber having a diameter D at the inlet to finder tube 108, a vortex stabilizer having a length of about D to 1.5 D, and a finder tube diameter of about 0.3 to 0.5 D.

FIGS. 6 and 7 illustrate internal separator baffle configurations which are useful for controlling a flow of surging material SM (typically spent catalyst) within in-line cyclone separators. Turning first to FIG. 6, an alternative embodiment of an in-line cyclone separator 112 incorporates a conical baffle 114 defining a cyclonic separation zone SZ. The upwardly increasing radius of separation zone SZ is believed to promote the initial upward cyclonic flow of solids within the separation zone both because solids impacting on the inclined surface are more likely to be deflected upwardly into the cyclonic flow within the separation zone and because solids impacting on the inclined surface are more likely to strike a "glancing" blow against the surface, thereby retaining a greater component of momentum than if they directly impacted a vertical chamber wall. Similar conical separation zones can be formed in baffleless embodiments of the invention by using a generally conical separation chamber vessel.

Separator 112 also includes a radially symmetric upper baffle 116 for directing a surging reaction mixture flow outwardly and then downwardly into an annular space 122 located between conical baffle 114 and a cylindrical separator wall 124. By directing the surging mixture flow away from the cyclonic separation zone SZ in this manner, the directed-away reaction products remain isolated from the zone, thereby minimizing disruption to cyclonic motion within the zone. The generally open area above baffle 116 provides a void space useful for absorbing surging reaction mixture and damping pressure transients Under non-surge conditions, baffle 116 helps to separate and isolate the small portion of cyclonically moving catalyst whose momentum has caused it to rise as far as the upper end of conical baffle 116 by directing these catalyst particles downwardly into annular space 122.

Also of interest in FIG. 6 is a concentric aperture 126 located in a finder tube 120 for admitting stripping gases into finder tube 120. Unlike earlier embodiments, separator 112 does not include stripping gas inlets for admitting stripping gas into separator wall 124. Aperture 126 therefore provides an alternative means for drawing stripping gas into the solids-depleted vapor stream leaving separator 112.

FIG. 7 illustrates another vertical in-line cyclone separator 128 employing an upper baffle 130 having an inner upwardly inclined baffle member 132 and an outer downwardly inclined baffle member 134 for directing surging reaction mixture flow downwardly around a generally conical lower baffle 136 into an annular space 138. A preferred pair of stripping gas inlet apertures 140 and aperture baffles 142 are located near the bottom of separator 128 to impart cyclonic motion to stripping gas entering separator 128. Locating the stripping gas inlet structure upstream of the separation chamber can be preferred in some instances because stripping gas SG is drawn in upstream of the pressure drop caused by the operation of the separator.

The baffle designs of FIGS. 6 and 7 may offer improved performance over baffleless designs under certain operating conditions. The suitability of a particular baffle design should be determined empirically by testing baffle performance under the expected surge conditions.

The in-line cyclone separators discussed above represent several embodiments of an invention particularly suited to the separation of spent catalyst from a mixture of catalyst and hydrocarbon vapors. Additionally, the invention is broadly applicable to other solids separation applications where it is desired to quickly separate solids from a mixture of solids and gases in the presence of flow and pressure transients. The scope of the invention, therefore, is intended to be limited only by the following claims.

What is claimed is:

1. A method for separating solids from a mixture of solids and gases comprising the steps of:
    swirling the mixture to impart cyclonic motion to the mixture as the mixture is discharged from a conduit concentrically located within a radially symmetric generally closed vapor path separation chamber;
    maintaining an inventory of cyclonically swirling solids within the chamber to damp pressure or flow transients introduced into the chamber;
    cyclonically separating solids from the swirling mixture;
    collecting solids separated from the mixture; and
    collecting a solids-depleted gas from the chamber.

2. The method of claim 1 wherein the conduit is cylindrical and wherein the separation chamber and the conduit are concentrically oriented about a substantially vertical axis.

3. The method of claim 2 wherein the solids-depleted gas collecting step includes collecting the solids-depleted gas through a finder tube concentrically extending through a generally closed chamber top.

4. The method of claim 1 further including the step of introducing a process gas into the separation chamber.

5. The method of claim 1 wherein the chamber includes a generally conical wall defining a zone of cyclonic separation and wherein the mixture is discharged through an aperture located in the apex of the conical wall.

6. The method of claim 1 wherein the conduit is cylindrical and wherein the chamber and the conduit are concentrically located about a generally horizontal axis.

7. The method of claim 1 further comprising the step of introducing a gas present outside the chamber into the chamber through an aperture located in the chamber.

8. The method of claim 1 further comprising the step of tangentially introducing a gas present outside the chamber into the chamber to impart cyclonic motion to the introduced gas.

9. The method of claim 1 wherein the swirling step includes swirling the mixture into a radially symetric baffle concentrically located within the chamber.

10. A method for removing catalyst from a reaction mixture of spent catalyst and hydrocarbon vapors comprising the steps of:
    passing the mixture through a generally cylindrical conduit having a discharge end;
    swirling the mixture by passing the mixture over at least one swirl vane as the mixture exits the discharge end of the conduit;

maintaining an inventory of cyclonically swirling solids within the chamber to damp pressure or flow transients introduced into the chamber through the conduit;

cyclonically separating the mixture in a radially symmetric generally closed vapor path separation zone located concentrically around the open end of the conduit; and collecting a catalyst-depleted gas from the chamber through a finder tube concentrically extending into a generally closed upper end of the chamber.

11. The method of claim 10 wherein the conduit is generally vertical with an upper discharge end and wherein the separation chamber includes a generally open lower end located below the conduit discharge end, said open end being submerged in a bed of spent catalyst during separation operations.

12. The method of claim 10 further including the step of stabilizing the cyclonically swirling mixture by passing the mixture over a vortex stabilizer.

13. The method of claim 10 further including the step of introducing a process gas into the chamber through a chamber wall aperture.

14. The method of claim 13 wherein the introduced process gas is a quench gas used to cool cracked hydrocarbon vapors present in the separator.

15. The method of claim 10 further including the step of introducing a process gas into the finder tube through a tube aperture located in the tube above the chamber.

16. The method of claim 1 wherein the swirling step includes directing the swirling mixture into a separation zone located within a generally radially symetric baffle concentrically located within a chamber wall member so that surging reaction mixture can be channeled downwardly between the baffle and a cylindrical chamber wall member under surge conditions.

17. The method of claim 16 further comprising the step of deflecting an upwardly surging mixture downwardly off a baffle located within the chamber and above the radially symetric baffle.

18. A method for separating spent catalyst from a reaction mixture of spent catalyst and cracked hydrocarbons comprising the steps of:

discharging the reaction mixture from an upper riser reactor end;

swirling the reaction mixture by passing the mixture over a swirl vane and a vortex stabilizer as the mixture is discharged from the reactor upper end;

maintaining an inventory of cyclonically swirling solids within the chamber to damp pressure or flow transients introduced in the chamber through the conduit;

cyclonically separating spent catalyst from the swirling mixture in a radially symmetric generally closed vapor path separation chamber located concentrically about and surrounding the reactor upper end;

withdrawing a catalyst-depleted stream of hydrocarbon vapors from the chamber through a finder tube penetrating through the top of the cylindrical chamber;

allowing spent catalyst separated in the chamber to collect around a lower wall of the separation chamber;

passing a purge gas through the collected spent catalyst to purge hydrocarbon vapors from the catalyst, thereby forming a stripping gas including the purged vapors and purge gas; and introducing the stripping gas into the separation chamber.

19. The method of claim 18 wherein the introducing step includes flowing the stripping gas through a duct to impact cyclonic motion to the stripping gas as the stripping gas enters the chamber.

20. The method of claim 18 wherein the swirling step includes directing the swirling mixture upwardly through a generally radially symetric baffle located concentrically within a chamber wall member so that an upwardly surging reaction mixture can be channeled downwardly through an annulus located between the baffle and the chamber wall member under surge conditions.

21. The method of claim 20 further comprising the step of downwardly deflecting upwardly surging mixture into the annulus under surge conditions by deflecting the upwardly surging reaction mixture off an upper baffle located above the radially symetric baffle.

22. The method of claim 18 wherein the discharging step includes discharging the reaction mixture into a generally conical cyclonic separation zone.

23. The method of claim 18 further including the step of using the solids cyclonically swirling within the chamber to damp pressure or catalyst surges introduced into the chamber.

24. An apparatus for separating solids from a mixture of solids and gases, comprising:

a separation chamber having a radially symmetric wall member located between a generally closed chamber inlet end and a generally closed chamber outlet end;

a conduit concentrically located within the chamber inlet end for discharging the mixture into the chamber;

solids removal means for removing solids from the chamber;

solids-depleted gaseous outlet means for withdrawing a solids-depleted effluent from the chamber; and swirl means for imparting cyclonic motion to the mixture as the mixture is discharged into the chamber, thereby causing solids to centrifugally separate from the mixture and to move along the wall member towards the solids removal means while a solids-depleted gas is drawn through the chamber toward the solids-depleted gaseous outlet means.

25. The apparatus of claim 24 wherein the chamber is radially symmetric about a generally horizontal axis.

26. The apparatus of claim 25 wherein the chamber radius increases from the inlet end to the outlet end and wherein the solids removal means comprises a downwardly directed conduit communicating with the chamber outlet end.

27. The apparatus of claim 24 wherein the chamber wall member includes gas inlet means for allowing a gas to enter the chamber.

28. The apparatus of claim 24 wherein the chamber is radially symmetric about a generally vertical axis.

29. The apparatus of claim 28 wherein the solids-depleted gaseous inlet means comprises a finder tube extending through the outlet end and partially into the chamber.

30. The apparatus of claim 24 wherein the chamber wall member includes gas inlet apertures for admitting a gas into the chamber.

31. The apparatus of claim 30 further including means for cyclonically swirling the admitted gas as the gas enters the chamber.

32. The apparatus of claim 24 further including a radially symmetric baffle concentrically located with the chamber around the conduit chamber inlet end for allowing a surging flow of reaction mixture to pass downwardly between the baffle and the wall member.

33. An in-line cyclone separator for separating spent catalyst from a reaction mixture of spent catalyst and hydrocarbon vapors exiting an upper end of a cylindrical riser reactor comprising:
   a generally vertical centrifugal separation chamber including a radially symmetric chamber wall, said chamber having a closed-bottomed lower chamber portion surrounded by a lower chamber wall member coaxially located around the riser reactor upper end and an upper chamber portion defined by an upper chamber wall member extending concentrically upward above the riser reactor upper end;
   a chamber top fastened over the upper cylindrical wall portion for closing the top of the upper chamber;
   a finder tube extending concentrically through the chamber top and partially into the upper chamber portion for withdrawing a catalyst-depleted gas from the chamber; and
   a swirl vane attached to the riser reactor upper end for causing the discharged mixture to cyclonically swirl within the chamber, thereby causing catalyst to centrifugally separate from the mixture and to move downwardly through the chamber along the wall members while a catalyst-depleted gas is drawn through the chamber toward the finder tube.

34. The separator of claim 33 further including a vortex stabilizer concentrically protruding from the reactor upper end for stabilizing the cyclonic motion of the mixture within the chamber.

35. The separator of claim 33 wherein the swirl vane is curved.

36. The separator of claim 33 wherein the upper chamber wall member includes a plurality of stripping gas inlet apertures for admitting a stripping gas into the chamber.

37. The separator of claim 36 further comprising a stripping gas inlet duct located near a stripping gas inlet aperture for imparting cyclonic motion to the entering gas.

38. The separator of claim 33 wherein the finder tube includes a stripping gas inlet aperture for admitting a stripping gas into the finder tube.

39. The separator of claim 33 further comprising a radially symmetric baffle concentrically located within the chamber around the conduit chamber inlet end for allowing a surging flow of reaction mixture to pass downwardly between the baffle and the wall member.

40. The separator of claim 39 further comprising an upper chamber baffle located above an upper end of the radially symetric baffle for downwardly deflecting an upwardly surging flow of catalyst between the upper wall member and the baffle.

41. An apparatus for catalytically cracking hydrocarbons comprising:
   a generally vertical riser reactor for converting catalyst and hydrocarbon feedstock to a reaction mixture of spent catalyst and cracked hydrocarbon vapors, the reactor having a generally closed upper end for discharging the mixture of cracked hydrocarbons and spent catalyst;
   a generally vertical open-bottomed radially symmetric separation chamber concentrically located around the riser reactor upper end, the chamber having a lower chamber portion defined by a lower chamber wall member coaxially located around the riser reactor upper end and an upper chamber portion defined by an upper chamber wall member concentrically extending above the riser reactor upper end;
   a finder tube extending concentrically and downwardly partially into the upper chamber portion for withdrawing a catalyst-depleted gas from the chamber;
   a disengagement vessel enclosing the separation chamber and at least a portion of the riser reactor, the vessel having a bottom portion for collecting spent catalyst;
   a catalyst bed residing in said vessel, said bed having sufficient height to cause said separation chamber open bottom to be submerged in said bed during catalytic cracking, thereby defining a generally closed vapor path through the separator;
   means for stripping hydrocarbon vapors from the collected spent catalyst, said means causing a stripping gas to be released into the disengagement vessel above the collected spent catalyst; and
   swirl means attached to the riser reactor upper end for creating a cyclonically swirling inventory of spent catalyst and hydrocarbon vapors in the chamber, thereby causing catalyst to separate from the mixture by centrifugal force and to move downwardly through the chamber along the wall members toward the bottom portion of the disengagement vessel while the catalyst-depleted gas is drawn upwardly toward the finder tube.

42. The apparatus of claim 41 further comprising a generally conical baffle concentrically located within the chamber around the conduit chamber inlet end for directing a surging flow of catalyst downwardly between the upper wall member and the baffle.

43. The apparatus of claim 42 further comprising an upper baffle located above the conical baffle for downwardly deflecting an upwardly surging flow of catalyst between the upper wall member and the cylindrical baffle.

44. The apparatus of claim 41 further including a vortex stabilizer concentrically located near the reactor upper end for stabilizing the cyclonic motion of the mixture within the chamber.

45. The apparatus of claim 41 wherein the separator includes a stripping gas inlet aperture located on an upper end of the upper wall member near the finder tube.

46. The apparatus of claim 45 wherein the stripping gas inlet aperture is a substantially open annular area located between the finder tube and the upper wall member end.

* * * * *